(12) United States Patent
Narayanan

(10) Patent No.: US 7,564,801 B2
(45) Date of Patent: Jul. 21, 2009

(54) ROUTER REACHABILITY VERIFICATION IN IPV6 NETWORKS

(75) Inventor: Sathya Narayanan, Plainsboro, NJ (US)

(73) Assignee: Panasonic Corporation, Osaka (JP)

( * ) Notice: Subject to any disclaimer, the term of this patent is extended or adjusted under 35 U.S.C. 154(b) by 828 days.

(21) Appl. No.: 10/920,006

(22) Filed: Aug. 17, 2004

(65) Prior Publication Data

US 2006/0039314 A1 Feb. 23, 2006

(51) Int. Cl.
*H04L 12/28* (2006.01)

(52) U.S. Cl. ............... 370/254; 370/331; 370/351; 370/232; 370/334; 455/333

(58) Field of Classification Search ............ 370/331, 370/351, 232, 328, 329, 310, 338, 310.2, 370/393, 401, 349, 334, 254, 339; 709/227, 709/217, 328, 331, 339; 455/333, 328, 331, 455/339
See application file for complete search history.

(56) References Cited

U.S. PATENT DOCUMENTS

| | | | |
|---|---|---|---|
| 7,257,104 B2 * | 8/2007 | Shitama ................... 370/338 |
| 2002/0049059 A1 * | 4/2002 | Soininen et al. ............ 455/439 |
| 2003/0018810 A1 * | 1/2003 | Karagiannis et al. ........ 709/238 |
| 2004/0063402 A1 * | 4/2004 | Takeda et al. ............. 455/41.1 |
| 2004/0196808 A1 * | 10/2004 | Chaskar et al. ............ 370/331 |
| 2004/0203596 A1 * | 10/2004 | Sreemanthula et al. ...... 455/411 |
| 2004/0208144 A1 * | 10/2004 | Vinayakray-Jani .......... 370/331 |
| 2004/0228428 A1 * | 11/2004 | Cho ..................... 375/354 |
| 2005/0185612 A1 * | 8/2005 | He ...................... 370/329 |
| 2005/0201284 A1 * | 9/2005 | Cheriton ................. 370/232 |

OTHER PUBLICATIONS

James Kempf (Docomo Labs USA), et al., "IPv6 Fast Router Advertisement," IETF Standard-Working-Draft, Internet Engineering Task Force, Ch., No. 5, Jul. 19, 2004, whole document.
G. Daley (Monash University CTIE), et al., "Deterministic Fast Router Advertisement Configuration," IETF Standard-Working-Draft, Internet Engineering Task Force, Ch., Jul. 12, 2004, whole document.
F. Templin (Nokia), et al., "Intra-Site Automatic Tunnel Addressing Protocol (ISATAP)," IETF Standard-Working-Draft, Internet Engineering Task Force, Ch., vol. ngtrans, No. 11, Jan. 17, 2003, whole document.

(Continued)

*Primary Examiner*—Nick Corsaro
*Assistant Examiner*—Julio R Perez
(74) *Attorney, Agent, or Firm*—RatnerPrestia (57) ABSTRACT

A method of router reachability verification for hosts in computer networks such as IPv6 networks is presented where hosts transmit router solicitations including information identifying a current router, and possibly one or more previous routers. A router that receives the router solicitations may then determine if it is the current router or one of the previous routers from the router solicitation information. If a router receiving the router solicitation is the current router, it waits a first delay before transmitting a router advertisement (RA). If the router is not a current router, it waits a second, longer delay. Accordingly, hosts may receive RAs from their current router before any other routers, thereby preventing unnecessary hand-offs. Also, RAs may include target host addresses so that hosts receiving the RAs may be aware of router reachability and avoid attempting to configure to undesirable routers.

29 Claims, 6 Drawing Sheets

OTHER PUBLICATIONS

Jinhyeock CHOI (Samsung AIT), et al., "DNA solution framework," IETF Standard-Working-Draft, Internet Engineering Task Force, Ch., Jul. 12, 2004, whole document.

Jinhyeock Choi (Samsung AIT), et al., "Detecting Network Attachment in IPv6 Goals," IETF Standard-Working-Draft, Internet Engineering Task Force, Ch., Feb. 2004, whole document.

S. Narayanan (Panasonic), "Recommendaitons to achieve efficient Router Reachability Detectin in IPv6 networks," IETF Standard-Working-Draft, Internet Engineering Task Force, Ch., No. 1, Feb. 20, 2005, whole document.

Jinhyeock Choi (Samsung AIT), et al., "Router Advertisement Issues for Movement Detection/Detection of Network Attachment," IETF Standard-Working-Draft, Internet Engineering Task Force, Ch., Oct. 2003, whole document.

International Search Report for PCT/US2005/019338.

* cited by examiner

| PRIORITY | LAST HIT |
|---|---|
| 1st | ROUTER 4 |
| 2nd | ROUTER 2 |
| ... | ... |
| $n^{th}$ | ROUTER X |

FIG. 3A

| PRIORITY | TOTAL | ROUTER |
|---|---|---|
| 1st | 555 | 7 |
| 2nd | 400 | 9 |
| ... | ... | ... |
| $n^{th}$ | 1 | x |

FIG. 3B

| PRIORITY | AVERAGE | ROUTER |
|---|---|---|
| 1st | 55 | 5 |
| 2nd | 40 | 22 |
| ... | ... | ... |
| $n^{th}$ | 1 | x |

ROUTER REACHABILITY VERIFICATION IN IPV6 NETWORKS

BACKGROUND OF THE INVENTION

The present invention concerns computer networks and, in particular, a method for router reachability verification for hosts on a network.

In mobile networks, for example, a mobile device (i.e., the host) such as a portable computer with a wireless local area network (WLAN) connection may connect to a network (e.g., the Internet) through a stationary access point. When the mobile device is moved, however, it may move to a location that is out of the range of its existing access point but within range of a new access point. Therefore, to prevent loss of connection to the network, the mobile device is "handed-off" from the old access point to the new. This hand-off occurs both on level 2 (i.e. the data link layer) and level 3 (i.e. the network layer) of the open system interconnect (OSI) network model. During the hand-off process, the mobile device may not be able to send and receive data packets until both the level 2 and level 3 connections are resolved with the new access point and router. This handoff latency is undesirable and may even prevent certain applications (e.g. voice over IP, streaming media, and real-time applications) from running due to the relatively long latency and consequent interruption of data flow between the mobile device and the network.

At level 2, the mobile device probes the new access point to identify a channel that it may use to communicate with the access point. Typically, wireless channels correspond to pre-determined frequency bands that are defined depending on the communications protocol being used (e.g., 802.11). Because a mobile device may try several channels before finding one on which it can communicate with the new access point, the latency due to establishing a level 2 connection alone may be as much as 400-500 ms.

Once a level 2 connection is established, the mobile device may then configure itself (i.e., at the network level, level 3) with parameters appropriate for a new access router. This is typically done by having the mobile device send a router solicitation message in its new environment. When the router receives the router solicitation message, it responds with a router advertisement message. This message is not sent immediately upon receipt of the router solicitation message but is sent with a random delay to prevent flooding that may occur when multiple routers communicate on the same channel. The router solicitation message and router advertisement message are described in Internet Request for Comments (RFC) 2461 entitled "Neighbor Discovery for IP Version 6 (IPv6)."

When a mobile device attaches itself to a new layer-2 link, it needs to detect whether its layer-3 link has changed.

In many situations, a mobile device that initiates a new level 2 connection may receive router advertisements from more than one router in response to its router solicitation. However, some of the router advertisements may be from routers replying to the solicitations of other mobile devices. The current mobile device is not able to confirm bi-directional reachability with the router when it can not confirm whether the router advertisement it received is in response to its solicitation or to the solicitation from some other mobile device. RFC 2461 describes a method whereby a router may specifically uni-cast a router advertisement in response to each individual router solicitation from a plurality of hosts (e.g., mobile devices). This method, however, may undesirably increase traffic on a dynamic network where hosts are rapidly joining and leaving and thereby sending a large number of router solicitations, each of which must be responded to individually by the router.

Additionally, a mobile device may have been previously connected to a router that is still accessible once a new level 2 connection is established. If the mobile device attempts to configure itself using the first router advertisement received in response to its router solicitation, it may be configuring itself using a router advertisement from a new router, thereby requiring the mobile device to unnecessarily initiate a new level 3 configuration. These unnecessary re-configurations may be referred to as erroneous movement detection, since the mobile device may have continued to use its existing level 3 configuration.

Furthermore, each router of a plurality of routers may have to respond to each one of a plurality of router solicitations, undesirably increasing the data traffic in the communication channel. This problem is most evident in "hot spots," for example, airport terminals or other public venues where hand-off traffic is likely to be relatively significant.

All of the methods of layer 3 configuration in the prior art, as described above, may result in undesirable and unnecessary layer 3 re-configurations as well as an undesirable increase in network traffic. Those skilled in the art will recognize that such methods and undesirable traits are not limited to mobile networks and wireless LANs.

SUMMARY OF THE INVENTION

The present invention is embodied in a method of soliciting routers comprising the steps of transmitting a router solicitation message including information on a current router, including an identifier for the router. In a further embodiment, the method includes the steps of receiving a router advertisement message, remaining connected to the current router if the router advertisement message is from the current router, and connecting to a new router if the router advertisement message isn't from the current router.

In another embodiment, the method may include the steps of remaining connected to the current router if the router advertisement message is from the current router and includes a host target address, connecting to a new router if the router advertisement message isn't from the current router and includes the host target address, and executing explicit neighbor discovery protocol (e.g., neighbor solicitation-neighbor advertisement exchange) with the router before connecting to it if the router advertisement message doesn't include the host target address.

In an alternate embodiment, the router solicitation message may include further information identifying one or more previous routers, and the method further includes the step of connecting to a previous router of the one or more previous routers if the router advertisement message is from the previous router. In a further embodiment, the method may include the step of arranging the information on the one or more previous routers according to a measure of priority.

The present invention is also embodied in a method of advertising a router, including the steps of receiving a router solicitation message from a host—the solicitation message including information on a current router—determining from the information if the router is the current router, waiting a random delay between 0 seconds and a "current router maximum delay" if the router is the current router, waiting a random delay greater than an "other router minimum delay" if the router isn't the current router, and transmitting a router advertisement message after the random delay.

In a further embodiment, the router advertisement message includes one or more target addresses identifying the host or hosts from which RS messages have been received. The RA messages are in response to those RS messages.

According to another aspect of the invention, a method includes the steps of initializing a token bucket having a number of tokens no greater than a predetermined maximum, refilling the token bucket with one or more tokens at a predetermined token refill rate, and removing one or more tokens and transmitting router advertisement messages in response to a router solicitation message.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

One embodiment of the present invention is a method by which hosts connected to a network through a router may experience fluctuations in their configuration but may keep their configuration without erroneously initiating a new connection. Another embodiment of the present invention is a method by which routers may respond efficiently to router solicitations and may also provide reachability verification.

Figure 1:
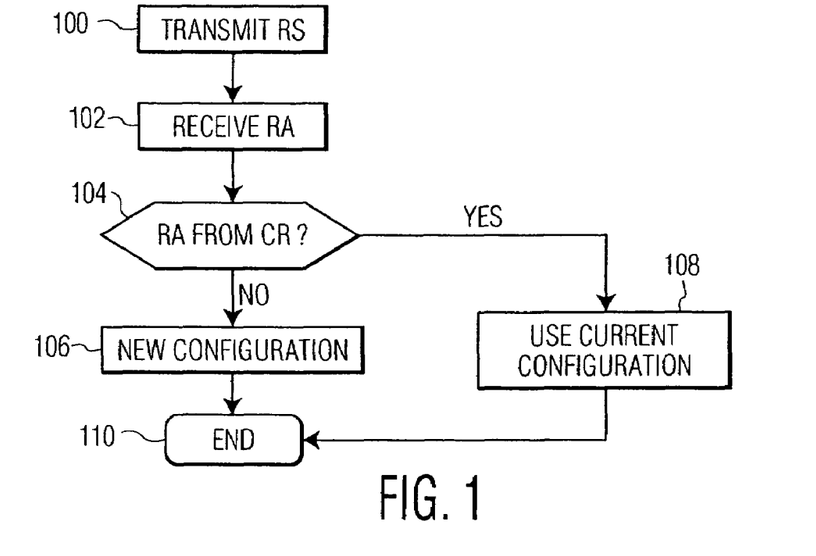
FIG. 1 is a flow-chart diagram describing a method of soliciting a router, according to an embodiment of the present invention.

Referring now to the drawing, in which like reference numbers refer to like elements throughout the various figures that comprise the drawing, FIG. 1 is a flow-chart illustrating an exemplary process that may be used by a host to detect network attachment (DNA) and to configure itself with a router, according to the present invention. In step 100, the host transmits a router solicitation (RS) message that includes information identifying the most recent router to which it was connected prior to DNA (i.e., the current router). After a certain period of time, the host receives a router advertisement message (RA) in step 102. In step 104, the host determines if the RA was sent from the current router (CR). If the RA received in step 102 is indeed from the current router, then the host does not need to re-configure itself to a new router, and, therefore, may stay connected to the current router in step 108. If the RA is not from the current router, then, in step 106, the host may re-configure itself for a new connection to the network through the new router that transmitted the RA. Once DNA is completed and the host is connected to the network, the process may end in step 110. Accordingly, it may be seen that the host may preclude unnecessary re-configuration to a router if it is already connected to the router.

In the process described above, however, a host may receive a RA from a router that may not be accessible (i.e., a bi-directional connectivity may not be completely functional—in wireless networks such asymmetric connectivity is possible). In such instances, it is desirable that the host be able to perform router reachability verification (RRV) prior to attempting to change its current IP configuration or keep its old configuration. In accordance with one embodiment of the present invention, therefore, a router responding to a RS from a host may include that host's link-local address in the RA (i.e., target host address).

Figure 2A:
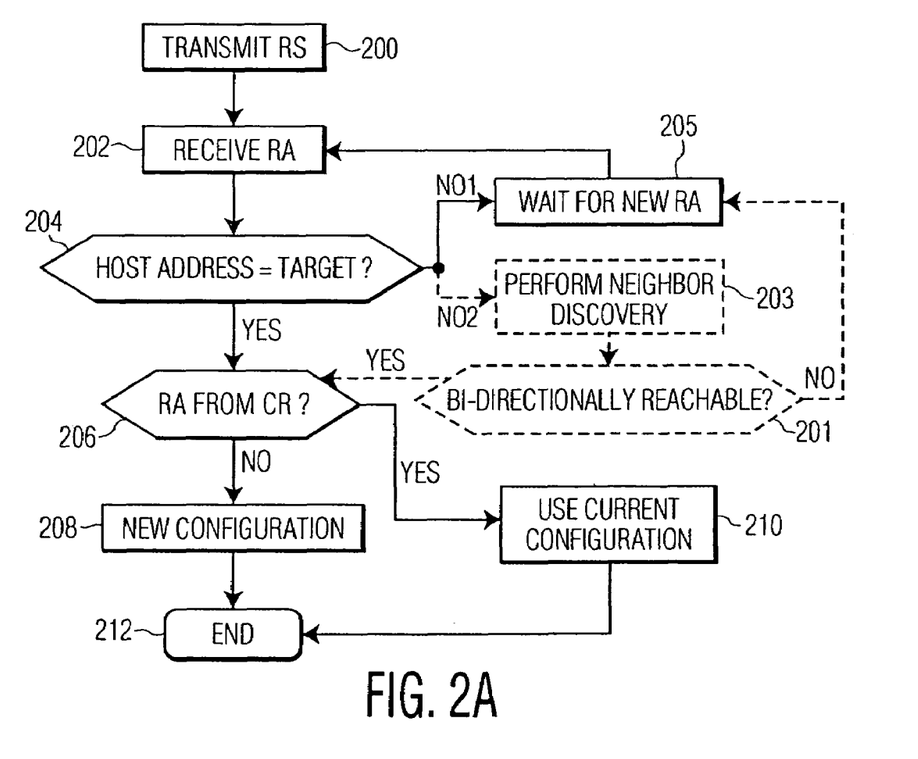
FIGS. 2A and 2B are additional flow-chart diagrams describing a further method of soliciting a router, according to an embodiment of the present invention.

Accordingly, FIG. 2A is a flow-chart illustrating an embodiment of the invention as a process that may be taken by a host for detecting network attachment (DNA) and router reachability, to configure itself with a reachable router. In step 200, the host transmits a RS. In a further embodiment, the RS may include information identifying the most recent router the host was connected to prior to DNA (i.e., the current router). After a certain period of time, the host receives a RA in step 202. In step 204, the host determines if a target host address included in the RA corresponds to its own link-local address.

If the RA doesn't include the link-local address for the host, then the host may follow path "NO1" and wait for a new RA in step 205. Alternately, the host may follow path "NO2" to step 203 (shown in phantom), which performs neighbor discovery procedure as defined in RFC 2461 to confirm bi-directional reachability with the router from which the RA was received. This may provide, for example, backwards compatibility with reachable routers in the system that do not implement the target host address option.

If, in step 204, the host determines that the target address includes its link-local address, then the process proceeds to step 206. In step 206, the host determines if the RA was sent from the current router. If the RA received in step 202 is indeed from the current router, then the host does not need to re-configure itself to a new router, and, therefore, may stay connected to the current router in step 210. If the RA is not from the current router, then, in step 208, the host may re-configure itself for a new connection to the network through the new router that transmitted the RA. Once DNA is completed and the host is connected to the network, the process may end in step 212. Accordingly, it may be seen that the host may preclude unnecessary re-configuration to a new router if it is already connected to the current router and the current router is reachable from the new access point. It may also be seen that the host will only attempt configuring itself to a router that has provided an indication of reachability, and thus the host may further preclude undesirable configuration to an unreachable router.

Figure 2B:
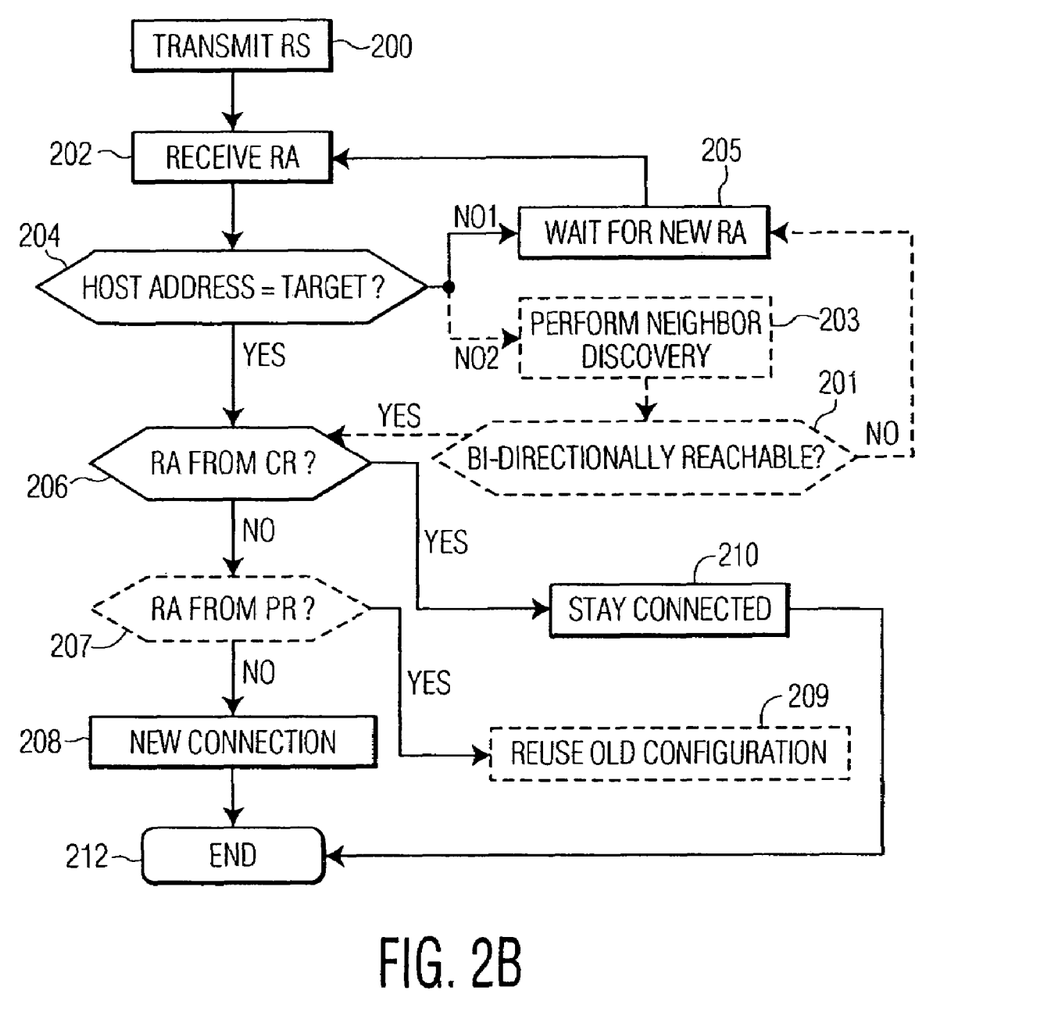

FIG. 2B illustrates an alternate process for detecting network attachment and router reachability. In step 200, the host transmits a RS having information identifying the current router as well as one or more previous routers it has connected to in the past. After a certain period of time, the host receives a RA from a router in step 202. In one embodiment of the invention, router reachability may be achieved by the inclusion of a target host address in the RA, as described above, whereby the host determines in step 204 if a target host address included in the RA corresponds to its own link-local address.

If the RA doesn't include the link-local address for the host, then the host may follow path "NO1" and wait for a new RA in step 205. Alternately, the host may follow path "NO2" to step 203 (shown in phantom), which performs neighbor discovery procedure as defined in RFC 2461 to confirm bi-directional reachability with the router from which the RA was received. This may provide, for example, backwards compatibility with reachable routers in the system that do not implement the target host address option.

If the RA does include the link-local address of the host, then the process will move to step 206 where the host determines whether the RA is from the current router. If it is, then the host will remain connected to the current router at step 210 and the process will end at step 212. If the RA is not from the current router, then the host will determine, in additional step 207 (shown in phantom), if the RA is from one of the one or more previous routers. If so, then in step 209, the host will retrieve the previous router's connection information from memory and use said information to initiate a connection with the previous router. If the RA is neither from the current router nor any one of the previous routers, then the host will configure itself with the new router information in step 208, whereby the process will end in step 212 once a configuration is done.

In one embodiment of the invention, the host may arrange the one or more previous routers in a priority list. Alternately, it may assign each previous router a measure of priority without explicitly arranging the routers in a list. Accordingly, in the one embodiment, the host may transmit the priority list and/or measures of priority in the router solicitation message, whereby routers receiving the RS that are included on the priority list may respond with time delays based on their priority level.

Figure 3A:
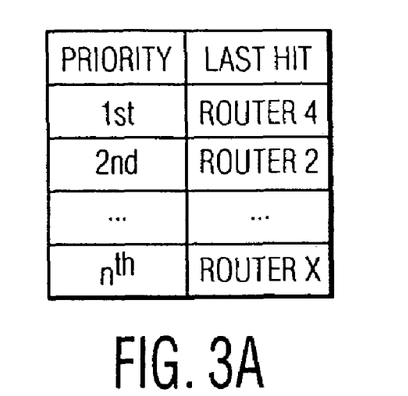
FIGS. 3A, 3B, and 3C are exemplary priority lists of stored connection information according to an embodiment of the present invention.
Figure 3B:
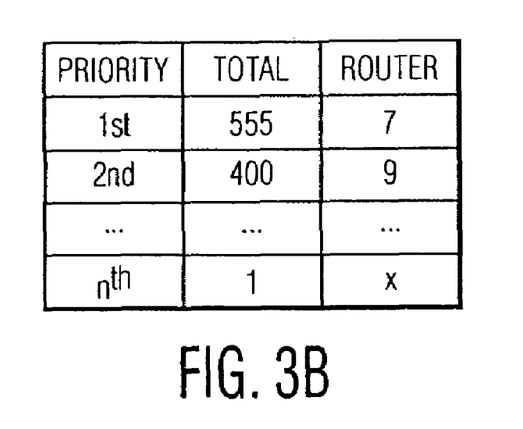
Figure 3C:
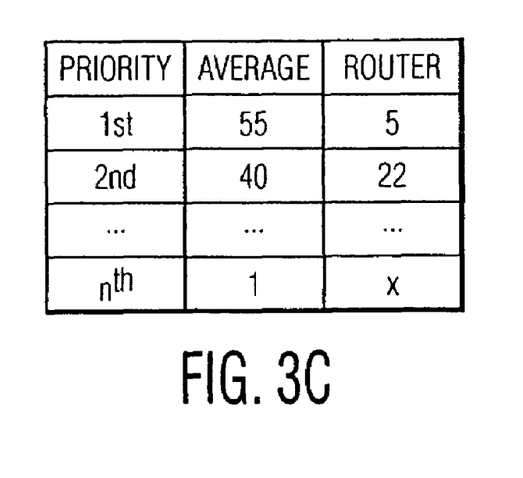
Figure 4A:
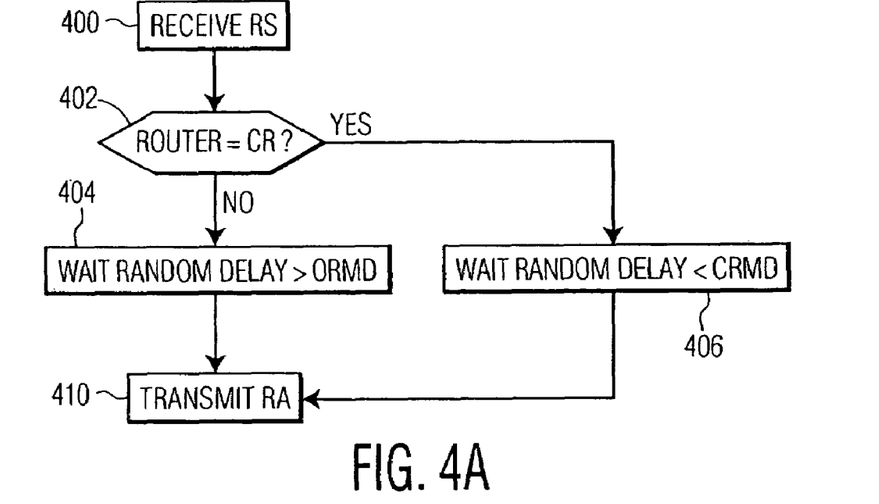
FIGS. 4A and 4B are flow-chart diagrams describing a method of advertising a router, according to an embodiment of the present invention.

According to separate exemplary embodiments of the invention, FIGS. 3A-C illustrate priority lists that may be used. In one embodiment, the table keeps a list of routers having priorities from $1^{st}$ to $n^{th}$ in order of the last received transmission or connection. In FIG. 4A, for example, the last received (i.e., newest) transmission/connection was from/with a router designated as router 4, which is given $1^{st}$ priority in the list; the second to last transmission/connection was from/with router 2, which is designated as having $2^{nd}$ priority; and the oldest transmission/connection was from/with router x, which is designated as having $n^{th}$ priority, where "n" can be any desirable number of priorities. Although illustrated as having at least 3 priority levels, the priority list may also be only one or more levels deep.

In a further embodiment of the invention, the table keeps a list of priorities from $1^{st}$ to $n^{th}$ in order of the total number of transmissions received starting from any predetermined moment in time. In FIG. 3B, for example, connection information for router 7 has been received 555 times, which is the most of any other router. Consequently, router 7 is given $1^{st}$ priority on the list. The second highest number of received transmission have been directed to connection information for router point 9, which is therefore given $2^{nd}$ priority, and so on.

In yet another embodiment, the table keeps a list of averages or weighted averages from $1^{st}$ to $n^{th}$ priority in order of descending average. The average may be the number of transmissions of connection information received for a particular router over a predetermined length of time, for example; it may also be the average signal strength of such transmissions received over a predetermined length of time; alternatively it may be a weighted product of the total number of such transmissions received and the average signal strength. In FIG. 3C, for example, connection information for router 5 has the a priority average of 55, which is the most of any other router and may indicate that connection information for router 5 was received 55 times in the last minute, for example. Consequently, router 5 is given $1^{st}$ priority on the list. Router 22 has a priority average of 40, for example, and is therefore given $2^{nd}$ priority, and so on. Those skilled in the art will recognize that there may be many desirable implementations of the average calculation as one of many possible equations, formulae, or algorithms that provide an indication of preference or priority, without departing from the invention. Furthermore, the transmissions described above may be uni-cast or multi-cast router advertisements transmitted by the routers, for example.

In another embodiment of the present invention, a method is provided for advertising a router. As illustrated in FIG. 4A, a router receives a router solicitation message including information identifying a current router in step 400. In step 402, the router determines if it is the current router. If it is, then it will wait a first random delay that is less than a current router maximum delay variable in step 406. If it is not the current router, then it will wait a second random delay greater than an other router minimum delay variable. After waiting for a random delay in either of steps 404 and 406, the router will transmit a router advertisement in step 410. Those skilled in the art will recognize that these variables may be predetermined for a desirable probability of the current router responding to a router solicitation before another router. For example, the current router maximum delay may be less than or equal to the other router minimum delay. Accordingly, in the exemplary embodiment of the invention, the current router, if it is available, will always respond to a RS in a shorter period of time than any other router. Setting the "current router maximum delay" to 0 ms and the "other router minimum delay" to 10 ms, for example, ensures an immediate response from the current access router and avoids collision with other routers.

Figure 4B:
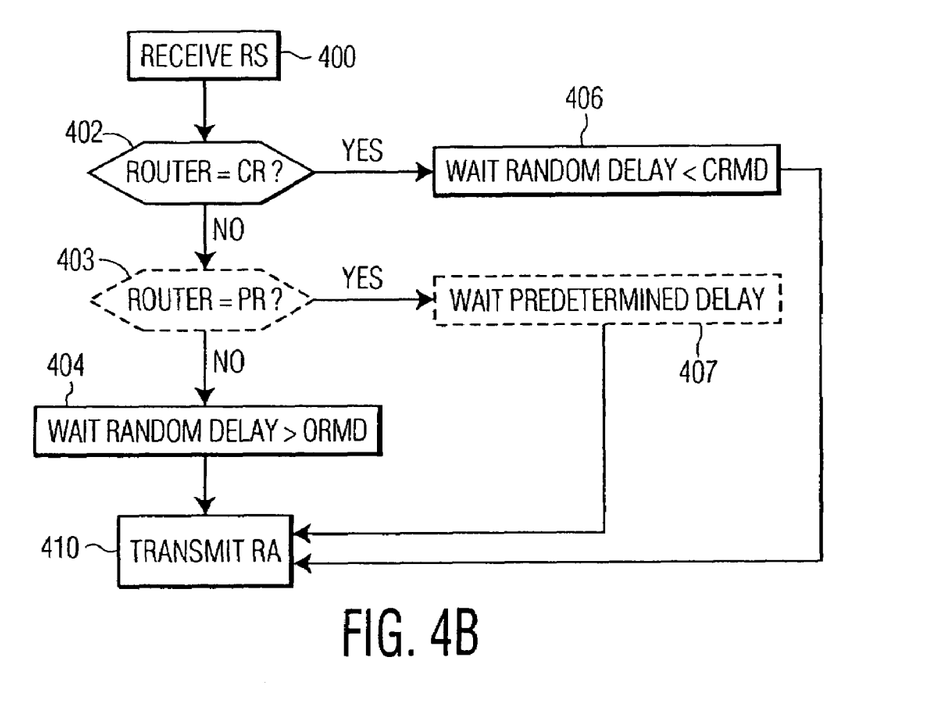

FIG. 4B illustrates an alternate embodiment of the present invention, wherein step 400 receives a router solicitation message having information on a current router as well as one or more previous routers. If the router is not the current router (in step 402), then it will check to see if it is one of the previous routers in additional step 403 (shown in phantom). If the router is the current router, then it will wait a first random delay between 0 seconds and a current router maximum delay in step 406. If the router is a previous router, then it will wait a second random delay between a previous router minimum delay and a previous router maximum delay in step 407. If the router determines in step 402 that it is not the current router, and in step 405 that it is not a previous router, then it will wait a third random delay greater than an other router minimum delay in step 404. After waiting for a random delay in either of steps 406, 407, and 404, the router will transmit a router advertisement in step 410.

In a further embodiment of the invention, the router solicitation message having information on the one or more previous routers also includes a measure of priority for each of the routers. Accordingly, each measure of priority has respective values of previous router minimum and maximum delays. Those skilled in the art will recognize that such delay variables may be predetermined for a desirable probability of the current router responding to a router solicitation before another router, and for higher priority previous routers responding to a router solicitation before other routers. For a first previous router having a higher measure of priority than a second previous router, for example, the previous router minimum delay and the previous router maximum delay may be shorter for the first previous router, and may be longer for the second previous router. Accordingly, it is likely that first previous router having the higher measure priority will respond to a router solicitation more quickly than the second previous router.

In one exemplary embodiment, the router solicitation message may include information only for the current router and a single previous router, wherein the current router maximum delay may be less than or equal to the previous router minimum delay. Furthermore, the other router minimum delay (i.e. the delay for routers other than those identified) may be greater than or equal to the previous router maximum delay. Accordingly, in the exemplary embodiment, the current router will respond to a RS in a shorter period of time than any other router. Further, the previous router will be the next to respond to the RS, and other routers will respond even later. Those skilled in the art will recognize that each previous router of the one or more previous routers may be provided with a unique predetermined time interval in which they may transmit their router advertisement, and that these intervals may be chosen such that previous routers with higher priorities respond more quickly than lower priority routers, as described above.

In an additional embodiment of the invention, a router responding to a router solicitation sent from a host having a link-local address, may respond to the host with a router advertisement including a target host address. The target host address may include the link-local addresses of all hosts that are being replied to with the router advertisement. Accordingly, a router responding to one or more router solicitations may find that it has a different priority in each router solicitation. Accordingly, the router may respond with a router advertisement in one of many ways. In an exemplary embodiment, the router may have a first priority in five router solicitations and a second priority lower than the first priority in three router solicitations. Accordingly, the router may choose to establish a queue to respond to each router solicitation individually, thereby waiting a first delay to respond to the five router solicitations (having higher priority), and waiting a second delay longer than the first delay to respond to the three other router solicitations (having lower priority). Alternately, the router may elect to respond to all the RS messages after the first wait time is over or calculate an average measure of priority based on all received router solicitations and send a single multi-cast router advertisement including link-local addresses of all the hosts after a predetermined time delay. Those skilled in the art will recognize that many other methods of responding to a plurality of router solicitations may be employed without departing from the spirit of the present invention.

It can also be seen by those skilled in the art that in a system with a large number of hosts, signal collision and interference may introduce undesirable communications quality. Accordingly, collisions and interference may be addressed by the use of a known protocol such as the IEEE 802.11 Medium Access Control (MAC) protocol, which has built in controls to limit or prevent collisions and device interference. Such protocols may the implement Carrier Sense Multiple Access (CSMA) contention protocol or a variation thereof, for example.

Figure 5:
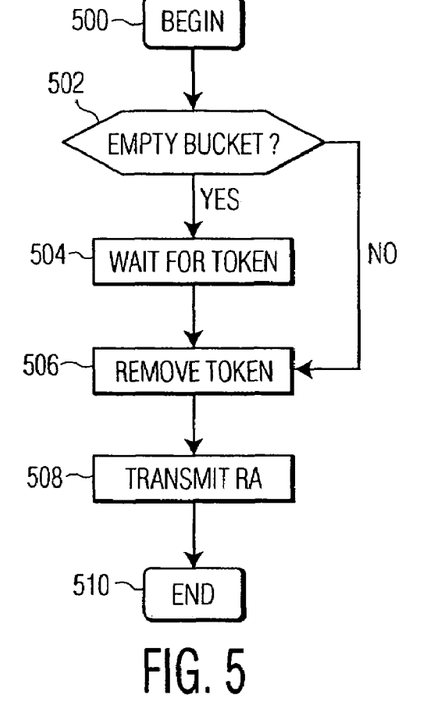
FIG. 5 is a flow-chart diagram that is useful for describing the use of a router advertisement token bucket according to an embodiment of the present invention.

According to a further embodiment of the invention, it may be desirable to limit the network traffic of routers responding to router solicitations. In RFC 2461, a minimum delay between router advertisements from any one router is specified, whereby any two multicast RAs must be separated by at least the minimum delay of time. Instead of having routers respond to each router solicitation with a predetermined minimum delay between router advertisements, a router advertisement token bucket may be implemented instead. In an exemplary embodiment of the invention, as shown in FIG. 5, whenever a router needs or attempts to transmit a router advertisement, step 500 begins the process. In step 502, the router checks the RA token bucket to see if is empty. If the bucket is empty, then the router waits for a token to appear in step 504. RA tokens may be refilled into the bucket at a predetermined RA refill rate. Those skilled in the art can recognize that by changing the RA refill rate, the amount of network traffic may be controlled. Once a token appears in the bucket, the router removes it in step 506 and transmits the router advertisement in step 508. If a token is already in the bucket in step 502, then the router removes it in step 506 and proceeds to transmit the RA in step 508. The process ends in step 510.

It is noted that routers may also transmit a periodical router advertisement message multicast to all devices within range. Each of these transmissions may also remove a token from the RA token bucket.

Accordingly, one embodiment of the invention may be a computer network comprising one or more hosts that transmit router solicitations having information on a respective current router, and one or more routers that receive the router solicitations and reply with a router advertisement, according to predetermined criteria, the router advertisement having information on the one or more hosts.

The computer network may further include a token bucket having a number of tokens no greater than a predetermined maximum, wherein the token bucket is refilled at a predetermined token refill rate, and one or more tokens are removed for each router advertisement message that is transmitted.

Figure 6:
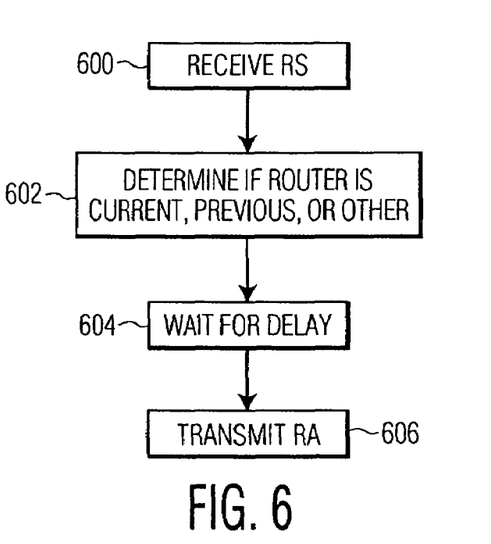
FIG. 6 is a flow-chart diagram describing a method of advertising a router, according to another embodiment of the present invention.

The flow-chart of FIG. 6 describes a method of router advertisement according to yet another embodiment of the invention. In step 600, the router receives a router solicitation message from a host having a host address. The host address may be any unique identifier provided to users on a network. In one embodiment, the host address may be a Data Link Control (DLC) address. In another embodiment, the network may be an IEEE 802.11 network and the host address may be a Media Access Control (MAC) address.

In step 602, the router determines if it is a current router (i.e., a router currently connected with the host or that was last connected to the host), a previous router (i.e., a router that was connected with the host sometime in the past), or an other router (i.e., a router that has never been connected with the host). Alternately, the router may only determine if it is a current router or an other router. Depending on whether the router is the current, previous, or other router, a different delay will be implemented in step 604.

After waiting a corresponding delay lasting a certain amount of time in step 604, the router may then transmit a router advertisement message in step 606. In one embodiment of the invention, the RA may include the host address of the host that originated the router solicitation. This allows the host to know that it is able to communicate with the router, thereby providing bi-directional reachability verification.

In one embodiment, the router solicitation message may include information on the current router. It may then be concluded that the router is the current router if the router matches the information on the current router. If the information does not match, then the router is another router. Alternately, the router solicitation message may include further information on one or more previous routers. It may then be concluded that the router is a previous router if the router matches the further information on one of the one or more previous routers. If the router does not match the information or the further information, then it is another router.

Figure 7:
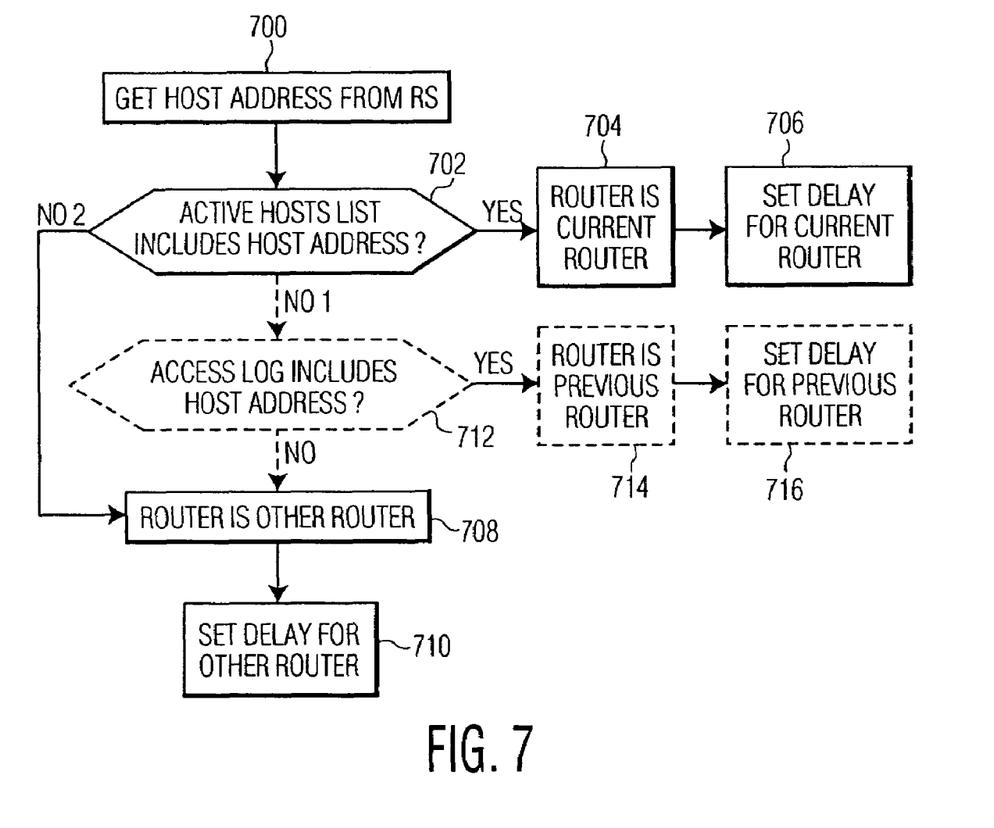
FIG. 7 is a flow-chart diagram describing a method of determining whether a router is a previous, current, or other router, according to a further embodiment of the present invention.

FIG. 7 illustrates one method of determining whether the router is a current, previous, or other router, according to an embodiment of the present invention. In this particular embodiment of the invention, the router maintains an active hosts list. In a further embodiment, the router may also maintain an access log. The active hosts list includes identifying information on hosts that are currently connected with the router, or that have been connected to the router within a recent period of time. The active hosts list identifying information may be, for example, DLC or MAC addresses. The access log may include identifying information on all hosts that have ever connected with the router. Alternately, the access log may include identifying information on only a predetermined number of hosts that have last connected with the router. The access log identifying information may further be dated and organized chronologically. Additionally, the access log and/or the active hosts list may be truncated to include information on only a certain number of hosts.

Step 700 starts the process by obtaining the host address from the router solicitation message of the host soliciting the router. In step 702, the router accesses the active hosts list and finds the host address. If the active hosts list includes the host address, then the process designates the router as being the current router in step 704. A first delay is set for the current router in step 706.

In one embodiment of the invention, if in step 702 the host address is not included in the active hosts list, the process follows the "NO 2" branch of the flow-chart to step 708. In step 708, the router is designated as being an other router. In step 710, a second delay is set for the other router. In an alternate embodiment, if in step 702 the host address is not included in the active hosts list, the process follows the "NO 1" branch of the flow-chart to step 712. In step 712, the router accesses the access log and finds the host address. If the access log does not include the host address, then in step 708, the router is designated as being an other router. Step 710 then sets the second delay. If in step 712 the access log includes the host address, however, the process will proceed to step 714, where the router is designated as being a previous router. Step 716 sets a third delay for the previous router.

After waiting the first, second, or third delay (not shown in FIG. 7), the router may transmit a router advertisement message (not shown in FIG. 7). In one embodiment of the invention, the first delay may be shorter than the second and third delays, and the third delay may be shorter than the second delay.

Furthermore, waiting the first delay may include waiting a first random delay less than or equal to an amount of time designated in a current router maximum delay variable. Additionally, waiting the third delay may include waiting a third random delay between a time interval designated by a previous router minimum delay and a previous router maximum delay variables. And finally, waiting the second delay may include waiting a second random delay greater than or equal to an amount of time designated in an other router minimum delay variable.

In one embodiment of the invention, the current router maximum delay variable may be less than or equal to the previous router minimum delay variable, and the other router minimum delay variable may be greater than or equal to the previous router maximum delay variable. Those skilled in the art will recognize that the delay variables above may be different for each application employing the present invention, and that such variables may be altered without departing from the invention.

In another embodiment of the invention, the amount of time a router waits before transmitting a router advertisement message may be determined based on the amount of time since a host originating a router solicitation was last in contact with the router. Accordingly, Table 1 illustrates an exemplary embodiment for one router, where Host1, Host2, and Host3 were connected with the router within the past 0-1 time units (e.g., seconds, minutes, hours, etc.). Accordingly, the router may qualify as being a current router of each of these hosts, and therefore, it may wait a random delay less than or equal to a current router maximum delay (CRMD) before transmitting a RA in response to a solicitation from one or more of Host1, Host2, and Host3.

Additionally, Host4 was last in contact with the router between 1 and 10 time units in the past. The router, therefore qualifies as being a previous router of Host4. Accordingly, the router may wait a random delay greater than or equal to a first previous router minimum delay (PRmin1) and less than or equal to a first previous router maximum delay (PRmax1) before transmitting a RA in response to a solicitation from Host4.

Host5 was last in contact with the router between 10 and 24 time units in the past. The router, therefore qualifies as being a previous router of Host5. Accordingly, the router may wait a random delay greater than or equal to a second previous router minimum delay (PRmin2) and less than or equal to a second previous router maximum delay (PRmax2) before sending a RA message in response to a solicitation from Host5.

Also, Host6 may have been in contact with the router longer than 24 time units in the past. The router may therefore qualify as being an other router of Host6. Accordingly, the router waits a random delay greater than or equal to an other router minimum delay (ORMD) before responding to a router solicitation from Host6.

TABLE 1

| Time Since Last Connection | Delay Variables | Qualifying Hosts |
| --- | --- | --- |
| 0-1 time units | CRMD | Host1, Host2, Host3 |
| 1-10 time units | PRmin1-PRmax1 | Host4 |
| 10-24 time units | PRmin2-PRmax2 | Host5 |
| 24+ time units | ORMD | Host6 |

Those skilled in the art will recognize that more gradations of time may be implemented to further stratify the delay structure shown in Table 1 without departing from the invention. Those skilled in the art will also recognize that the hosts may transmit the "Time Since Last Connection" information through their router solicitation messages, whereby the router won't have to store such information in order to respond to an RS accordingly.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of a host soliciting routers, the method comprising the steps of:

transmitting a router solicitation message including information identifying a current router;

responsive to the router solicitation message being received by the router identified in the solicitation message as the current router, waiting, by the current router, a first delay period and sending a router advertisement message;

responsive to the router solicitation message being received by routers other than the router identified in the solicitation message, as the current router, waiting at least a second delay period, longer than the first delay period, and sending, by each of the routers other than the current router, another router advertisement message if a router advertisement message is not previously received such that the current router remains configured as the operational router if the received router advertisement message is from the current router and a new router is configured as the operational router if the received router advertisement message is not from the current router.

2. A method according to claim 1, wherein the router solicitation message and router advertisement messages each includes a host address, and the method further comprises the step of discarding the received router advertisement message if the received router advertisement message does not include the host address of the receiving host.

3. A method of a host soliciting routers, the method comprising the steps of:

transmitting a router solicitation message including information identifying a current router and one or more previous routers;

responsive to the router solicitation message being received by the router identified as the current router in the solicitation message, waiting, by the current router, a first delay period and sending a first router advertisement message;

responsive to the router solicitation message being received by routers identified as previous routers in the solicitation message, waiting, by each of the previous routers, at least a second delay period, longer than the first delay period, and sending a second router advertisement message if the first router advertisement message is not previously received;

responsive to the router solicitation message being received by routers other than the routers identified in the solicitation message, waiting at least a third delay period, longer than the second delay period, and sending, by each of the routers other than the routers identified in the solicitation message, a third router advertisement message if the first or second router advertisement message is not previously received such that the current router remains configured as an operational router if the received router advertisement message is from the current router, a previous router of the one or more previous routers is configured as the operational router if the received router advertisement message is not from the current router but is from the one of the one or more previous routers, and a new router is configured as the operational router if the router advertisement message is not from the current router or the one or more previous routers.

4. A method according to claim 3, wherein the host includes a host address, and the method further comprises the step of discarding the received router advertisement message if the received router advertisement message does not include the host address of the host.

5. A method according to claim 3, further including the step of arranging the information identifying the one or more previous routers according to a measure of priority.

6. The method of claim 5, wherein the step of arranging includes giving a higher measure of priority to the one or more previous routers having a more recent time of last connection.

7. The method of claim 5, wherein the router solicitation message includes the measure of priority of each of the one or more previous routers.

8. A method of advertising a router, the method comprising the steps of:

receiving a router solicitation message from a host, the solicitation message including information identifying a current router;

determining from the information if the router is the current router;

selecting and waiting for a first random delay between 0 seconds and a current router maximum delay if the router is the determined current router;

selecting and waiting for a second random delay greater than another router minimum delay if the router is not the determined current router; and transmitting a router advertisement message after the selected first or second random delay, wherein the other router minimum delay is longer than or equal to the current router maximum delay.

9. A method according to claim 8, wherein the router advertisement message includes a target address identifying the host.

10. A method according to claim 8, wherein:

the step of receiving the router solicitation message from the host includes receiving a plurality of router solicitation messages from one or more hosts; and the router advertisement message includes a plurality of target addresses identifying the one or more hosts.

11. A method according to claim 8, further including the steps of:

initializing a token bucket having a number of tokens no greater than a predetermined maximum;

refilling the token bucket with one or more tokens at a predetermined token refill rate; and removing one or more tokens before sending each router advertisement message transmission.

12. A method of advertising a router, the method comprising the steps of:

receiving by the router, a router solicitation message from a host, the router solicitation message including information identifying a current router and one or more previous routers;

determining from the information if the router is one of the current router or the one or more previous routers;

selecting and waiting for a first random delay between 0 seconds and a current router maximum delay if the router is the determined current router;

selecting and waiting for a second random delay between a previous router minimum delay and a previous router maximum delay if the router is one of the determined one or more previous routers;

selecting and waiting for a third random delay greater than another router minimum delay if the router is not the determined current router or the determined one or more previous routers; and transmitting a router advertisement message after the selected first, second or third random delay, wherein the previous router minimum delay is longer than or equal to the current router maximum delay and the other router minimum delay is longer than or equal to the previous router maximum delay.

13. A method according to claim 12, wherein:
   each of the one or more previous routers has a respective measure of priority; and
   the previous router minimum delay and the previous router maximum delay are shorter for a previous router of the one or more previous routers having a higher measure of priority and longer for the previous router of the one or more previous routers having a lower measure of priority.

14. A method according to claim 12, wherein the router advertisement message includes a target address identifying the host.

15. A method according to claim 12, wherein:
   the step of receiving the router solicitation message from the host includes receiving a plurality of router solicitation messages from a respective plurality of hosts; and
   the router advertisement message includes a plurality of target addresses identifying the plurality of hosts.

16. A method according to claim 12, further including the steps of:
   initializing a token bucket having a number of tokens no greater than a predetermined maximum;
   refilling the token bucket with one or more tokens at a predetermined token refill rate; and
   removing one or more tokens before sending each router advertisement message transmission.

17. A computer network comprising:
   one or more hosts that transmit router solicitations having information identifying a respective current router; and
   one or more routers that receive the router solicitations and that each reply, according to predetermined criteria, with a router advertisement having information identifying the one or more hosts, wherein
   routers identified as current routers in the router solicitations set and wait for current router delay periods, and
   other routers not identified as the current routers in the router solicitations set and wait for other router delay periods, the other router delay periods being longer than the current router delay periods such that the routers identified as the current routers in the router solicitations respond with respective router advertisements with shorter delays than other routers not identified as current routers.

18. A computer network according to claim 17, further including a token bucket having a number of tokens no greater than a predetermined maximum, wherein:
   the token bucket is refilled at a predetermined token refill rate; and
   one or more tokens are removed for each router advertisement message that is transmitted.

19. A method of advertising a router, the method comprising the steps of:
   receiving a router solicitation message from a host having a host address and identifying a current router;
   determining if the router is one of the current router or another router for the host;
   waiting, by the router receiving the router solicitation message, for one of a first delay if the router is the current router or a second delay if the router is the other router; and
   transmitting, by the router receiving the router solicitation message, a router advertisement message after the one of the first or second delay,
   wherein the second delay is longer than the first delay.

20. The method according to claim 19, wherein the router advertisement message includes the host address.

21. The method according to claim 19, wherein the determining step includes concluding that the router is the current router if the router matches information identifying the current router from the solicitation message.

22. A method according to claim 19, wherein the determining step includes:
   accessing an active hosts list;
   concluding that the router is the current router if the received host address is included in the active hosts list; and
   concluding that the router is the other router if the received host address is not included in the active hosts list.

23. A method according to claim 19, wherein:
   the step of waiting the first delay includes waiting a first random delay less than or equal to a current router maximum delay; and
   the step of waiting the second delay includes waiting a second random delay greater than or equal to another router minimum delay.

24. The method of claim 23, wherein the current router maximum delay is less than or equal to the other router minimum delay.

25. A method according to claim 19, wherein the determining step includes determining if the router is a previous router, the method further comprising the step of waiting a third delay if the router is the previous router; and
   wherein the first delay is less than the third delay, and the third delay is less than the second delay.

26. A method according to claim 25, wherein:
   the router solicitation message includes information identifying the current router and further information identifying one or more previous routers; and
   the determining step includes
      concluding that the router is the current router if the router conforms to the information identifying the current router from the router solicitation message,
      concluding that the router is the previous router if the router conforms to the further information identifying one of the one or more previous routers from the router solicitation message, and
      concluding that the router is another router if the router does not conform to the information or the further information.

27. A method according to claim 25, wherein the determining step includes:
   accessing an active hosts list and an access log;
   concluding that the router is the current router if the host address is included in the active hosts list;
   concluding that the router is the previous router if the host address is included in the access log and not included in the active hosts list; and
   concluding that the router is the other router if the host address is not included in the access log.

28. A method according to claim 25, wherein the step of:
   waiting the first delay includes waiting a first random delay less than or equal to a current router maximum delay;
   waiting the third delay includes waiting a third random delay between a previous router minimum delay and a previous router maximum delay; and
   waiting the second delay includes waiting a second random delay greater than or equal to another router minimum delay.

29. The method of claim 28, wherein the current router maximum delay is less than or equal to the previous router minimum delay, and the other router minimum delay is greater than or equal to the previous router maximum delay.

* * * * *